United States Patent
Toyoda et al.

[11] Patent Number: 4,660,952
[45] Date of Patent: Apr. 28, 1987

[54] BLADE TYPE SHUTTER

[75] Inventors: Yasuhiro Toyoda, Kanagawa; Fumio Shimada; Katsumi Yoshida, both of Saitama, all of Japan

[73] Assignee: Canon Kabuashiki Kaisha, Tokyo, Japan

[21] Appl. No.: 707,837

[22] Filed: Mar. 4, 1985

[30] Foreign Application Priority Data

Mar. 5, 1984 [JP] Japan .............. 59-31557[U]
Mar. 6, 1984 [JP] Japan .............. 59-32392[U]

[51] Int. Cl.⁴ .............................................. G03B 9/40
[52] U.S. Cl. .................................. 354/246; 354/249; 354/250
[58] Field of Search ............... 354/246, 247, 248, 249, 354/250, 261, 245

[56] References Cited
U.S. PATENT DOCUMENTS 4,298,265 11/1981 Tanaka et al. .................. 354/246
4,401,380 8/1983 Sato et al. ....................... 354/246
4,486,084 12/1984 Sato et al. ....................... 354/246
4,529,285 7/1985 Uematsu ......................... 354/249

Primary Examiner—A. A. Mathews
Attorney, Agent, or Firm—Toren, McGeady and Goldberg

[57] ABSTRACT

In a focal plane shutter of the kind having a plurality of divided blades pivotally arranged to be turnable on driving arms in an overlapped state, the weight of the blades is reduced by making them from very thin material; the blades are reinforced with embossed protrusions which are formed in the longitudinal direction of the blades for the purpose of preventing them from flexing and being damaged during their travel. Each of the embossed protrusions is within the difference in stepped height between the surfaces of the blades and the heads of blade carrying studs disposed on the driving arms. Therefore, the shutter can be smoothly operated without increasing the thickness of the blades as a whole.

6 Claims, 33 Drawing Figures

FIG.8(a) FIG.8(b)
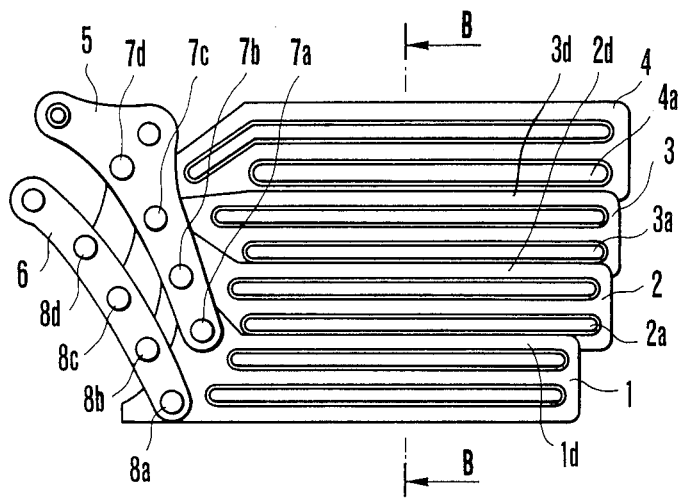 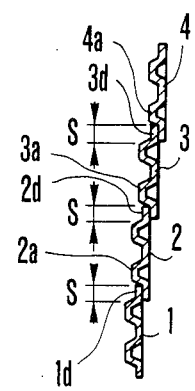
FIG.9(a) FIG.9(b)
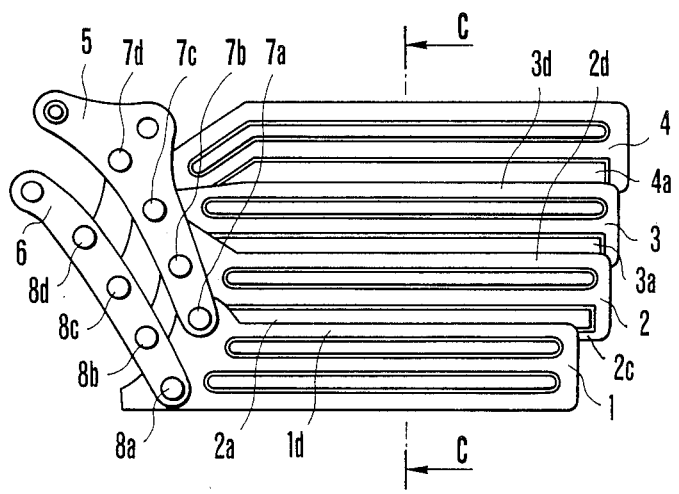 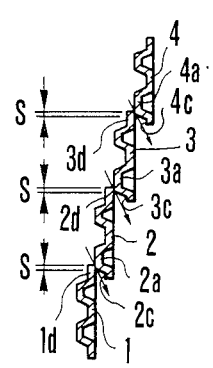

FIG.10(a)
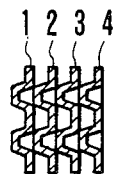
FIG.11(a)
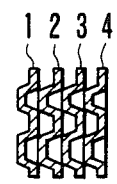
FIG.10(b)
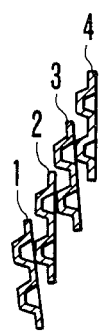
FIG.11(b)
FIG.12(a)      FIG.12(b)
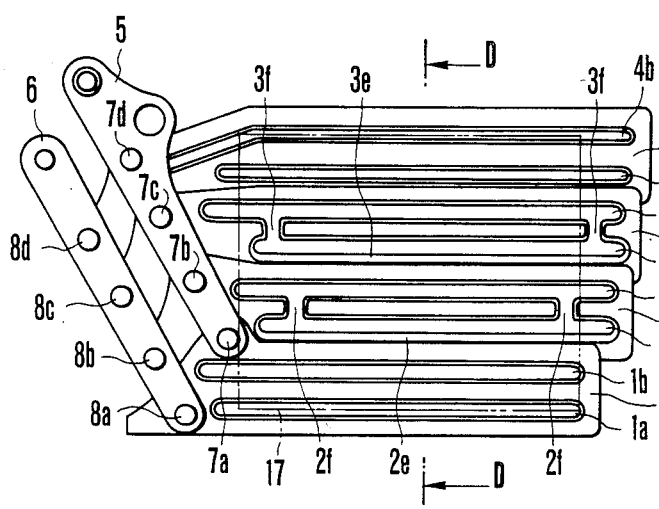 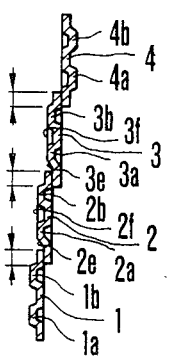

FIG.13 FIG.15(a) FIG.16
FIG.14 FIG.15(b)
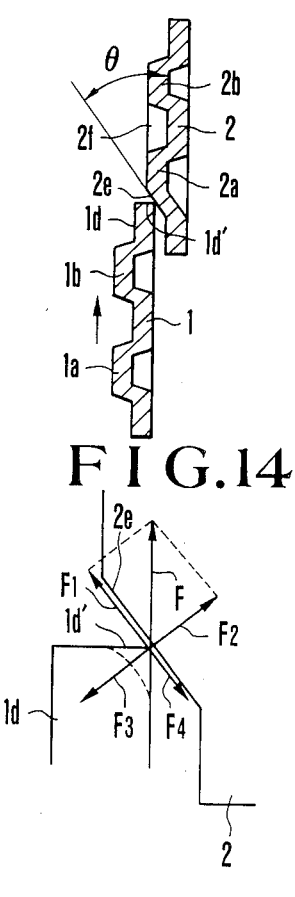
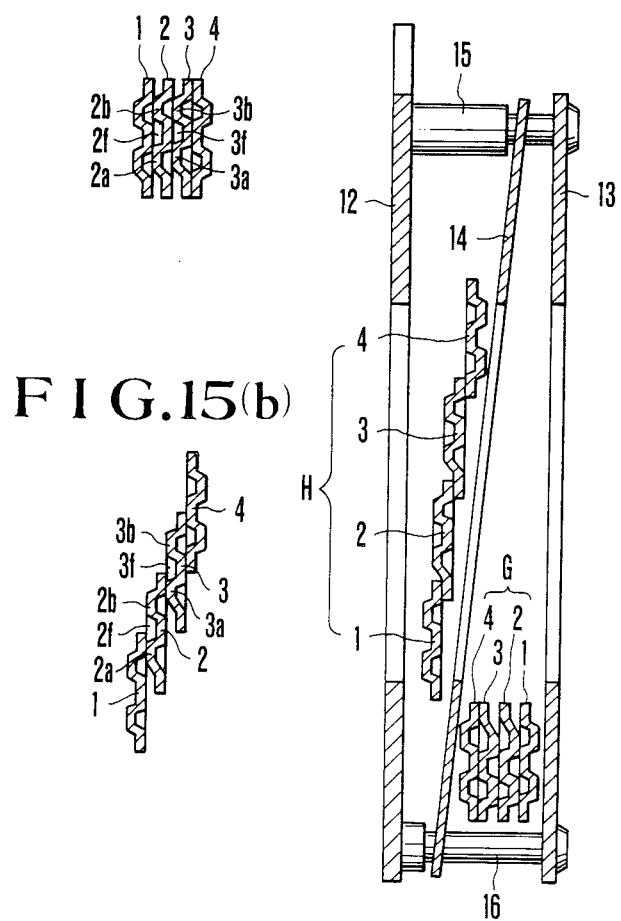

BLADE TYPE SHUTTER

BACKGROUND OF THE INVENTION

1. Field of the Invention

This invention relates to a focal plane shutter and more particularly to a blade type focal plane shutter which is capable of travelling at a high speed.

2. Description of the Prior Art

To broaden the photographable region of a single-lens reflex camera, it is desirable to increase the maximum shutter speed and to provide a shutter speed synchronizable with a flash device. To meet this requirement, the shutter blind or blade speed must be increased. It is considered most effective, for that purpose, to reduce the weight of the shutter blades. However, merely lessening the thickness of the shutter blade for weight reduction would result in a blade with excessively lowered strength. Then, while travelling at a high speed, a slit forming blade would flex and collide with a partition plate which would be damaged thereby or would pop out from the shutter aperture. Furthermore, it has been difficult to develop a new material that has a small specific gravity and yet is strong enough for standing high speed travelling operations.

To solve this problem, it is conceivable to reinforce the shutter blinds or blades by providing them with embossed parts which increase their rigidity.

The conventional laterally travelling focal plane shutters of the roller blind type include shutters of the kind having thin metal blinds made of titanium foil or the like which are provided with many oblong embossed parts for preventing them from flexing during their travel as shown in FIG. 1 of the accompanying drawings. In a shutter of this kind, leading and trailing shutter blinds 51 and 52 just overlap slit forming ferrule parts 53 and 54 respectively while the embossed blinds do not overlap each other. This arrangement eliminates the possibility of light leakage from any gap that otherwise would arise between these ferrules 53 and 54 due to overlapping of these embossed blinds.

However, the structural arrangement of blinds and driving drums in the shutter of this kind inevitably has a large inertia. Compared with blade type shutters, therefore, shutters of this kind have the disadvantage of increasing the shutter blind speed. Hence, it has been known that, in order to increase the shutter speed, the shutter must be of the blade type.

However, with the blade type shutter, the blades overlap each other during shutter operation. Therefore, simply embossed shutter blades do not closely contact each other. The inadequate contact tends to cause light leakage. Besides, the embossed parts tend to be resistant or to stick during a shutter operation. Then, smooth operation of the shutter blades is hardly possible. In that event, the shutter blind speed cannot be increased and the exposure accuracy and the durability of the blades of the shutter are deceased. Therefore, that kind of shutter is not practical.

It is therefore an object of this invention to provide a blade type focal plane shutter which is capable of travelling at a high speed and yet excels in strength to eliminate the above-stated shortcomings of the prior art by virtue of an arrangement, wherein shutter blades and particularly the slit forming blade which has a large amount of kinetic energy are provided with embossed parts formed by subjecting a metal material, preferably such a light metal material as titanium, aluminum, magnesium, or the like, to a relatively simple drawing or molding process.

The above and further objects and features of this invention will become apparent from the following detailed description of preferred embodiments thereof taken in conjunction with the accompanying drawings.

SUMMARY OF THE INVENTION

In a focal plane shutter having a shutter base plate which is provided with a shutter aperture and two groups of shutter blades which are arranged to open and close the aperture, the improvement comprising each of the shutter blade groups including driving arms pivotally carried by the base plate and arranged to be turnable thereon and a plurality of divided blades which are respectively connected to the arms through connecting studs and arranged to be turnable on the studs in such a manner that the divided blades overlap each other and that a slit forming divided blade which is located most closely to the arms among the divided blades is provided with embossed protrusions which extend in the longitudinal direction of the blade and are protruding on one side thereof not coming into contact with other blades.

BRIEF DESCRIPTION OF THE DRAWINGS

FIGS. 5(a)–7 are illustrations showing a second embodiment of this invention. Of these drawings, FIG. 5(a) is a front view of a group of blades in a second embodiment; FIG. 7 is a sectional side view of the shutter.

FIGS. 8(a)–11(b) show a problem arising when all the blades are provided with embossed parts, FIG. 8(a) being a front view of a group of blades; FIG. 8(b) being a sectional side view; FIG. 9(a) being a front view of a group of blades; FIG. 9(b) being a sectional side view; and FIGS. 10(a), 10(b), 11(a) and 11(b) being sectional side views showing the operating states of these blades.

FIG. 12(a) is a front view showing the group of blades of a third embodiment in this invention.

FIG. 12(b) is a side sectional view of the same blade group.

FIG. 13 is a sectional side view showing the action of a slanting face provided in the third embodiment.

FIG. 14 is an enlarged side view of the third embodiment in the area around the oblique surface of the blade.

FIG. 15(a) is a sectional side view showing the group of blades of FIG. 13 as in a stowed state.

FIG. 15(b) is a sectional side view showing the same group of blades in a condition midway in an opening or closing process.

FIG. 16 is a sectional side view showing a shutter including the group of blades shown in FIG. 13.

DETAILED DESCRIPTION OF THE PREFERRED EMBODIMENTS

Figure 1:
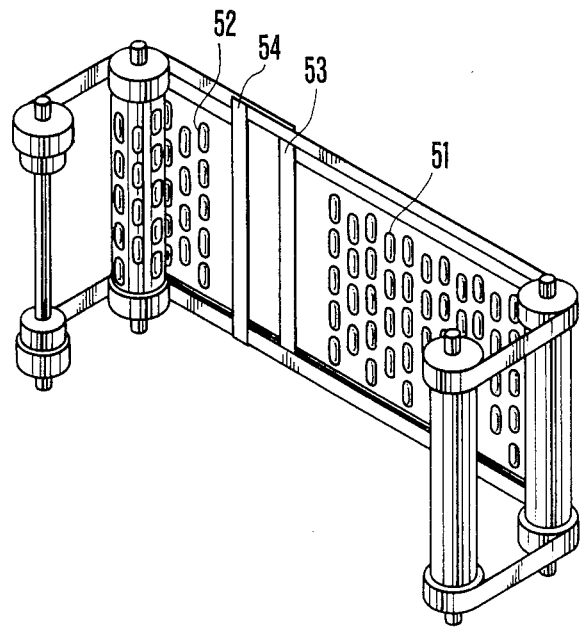
FIG. 1 is a oblique view showing a focal plane shutter of the prior art.

Before describing the embodiments of this invention, the group of blades of a focal plane shutter to which the invention is applicable is described below with reference to FIGS. 2 and 3 of the accompanying drawings:

A group of shutter blades include divided blades 1, 2, 3 and 4. Arms 5 and 6 have their base parts rotatably fitted on shafts 9 and 10, which are secured to a shutter base plate and which drive the blade group. The slit forming blade 1 is swingably carried by connecting studs 7a and 8a at the lower sides of the fore ends of these arms 5, 6. Between the stud 7a and the base part of the shaft 9 and between the stud 8a and that of the shaft 10 are disposed other connecting studs 7b, 8b, 7c, 8c, 7d and 8d, which pivotally carry the divided blades 2, 3 and 4, one after another, and have them overlapping in the order of blades 1, 2, 3 and 4 with the blade 4 disposed in the lowest position. They thus form parallel links. The arm 5 is provided with a hole 11. A power transmission pin of a driving device, which is not shown, is fitted in the hole 11. The driving force from the pin causes the arms 5 and 6 to turn on the shafts 9 and 10 respectively in such a way as to open or close a shutter aperture 17. In FIG. 2, the shutter blade group is shown covering the aperture 17. The shutter includes leading and trailing groups of blades. Each of the blade groups is arranged in exactly the same manner as the above-mentioned arrangement. These groups are mounted, one on the upper side of the shutter base plate and the other on the reverse side thereof.

Figure 2:
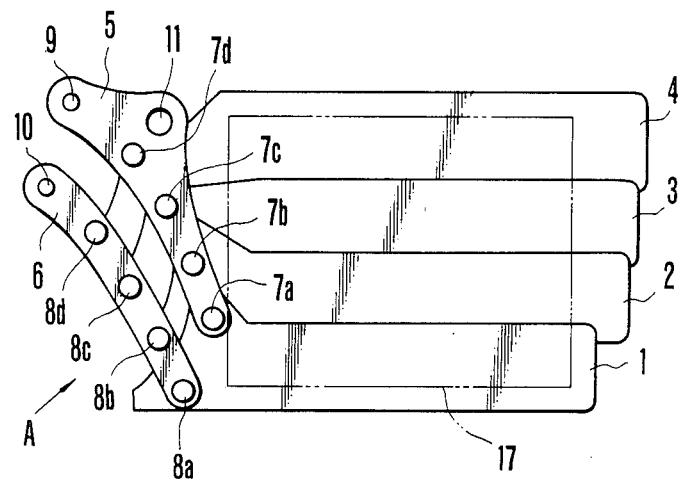
FIGS. 2 and 3 show a group of blades forming a focal plane shutter to which this invention is applicable.
Figure 3:
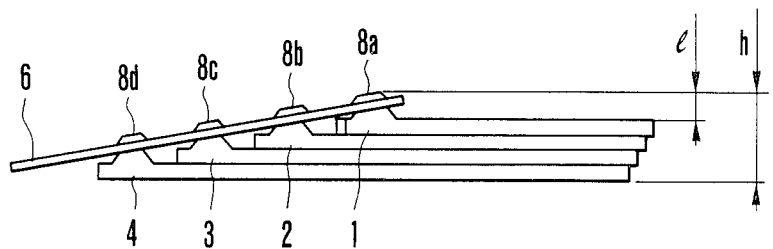
Figure 4:
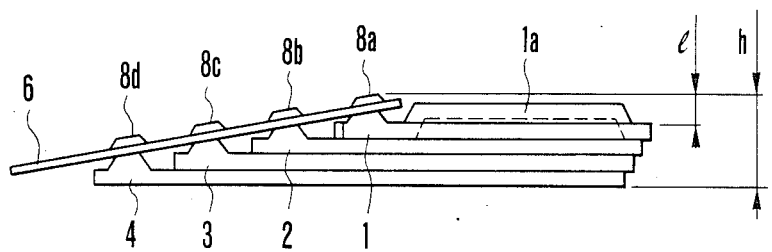
FIG. 4 shows a first embodiment of this invention.

FIG. 3 shows the group of shutter blades of FIG. 2 as viewed from the direction of arrow A. In FIG. 3, a reference symbol "h" identifies the total thickness of the shutter blade group. The thickness "h" is a little thinner than the thickness of a space provided for the travel of the shutter blade group. Between the surface of the slit forming blade 1 and the head part of the connecting stud 8a or 7a, there is a level difference distance "l". Since this surface of the blade 1 never contacts the other blades 2, 3, 4, there is provided some marginal allowance for allowing the surface area of the slit forming blade 1, except the area used for connection with the arms 5 and 6, to protrudes upward as viewed in FIG. 3. In view of this, in accordance with the arrangement of this embodiment, the slit forming blade 1 is provided with an embossed part 1a as shown in FIG. 4. In this instance, since the distance "l" is much larger than the thickness of the blade 1, the embossed part 1a can protrude to a sufficient extent. Therefore, the slit forming blade 1, which has a greater kinetic energy than the other blades 2, 3, 4 and the greatest impact when the blade group stops, can have a reduced weight while still retaining sufficient strength. The invented arrangement, therefore, greatly contributes to a desired arrangement for increasing the shutter blind speed.

In obtaining the same degree of bending rigidity as with conventional shutter blades, the embossed part 1a permits reduction in thickness. The possible reduction in thickness, therefore, gives some space that permits all the other blades 2, 3, 4 to be likewise provided with embossed parts 2a, 3a, 4a for weight reduction.

Figure 5A:
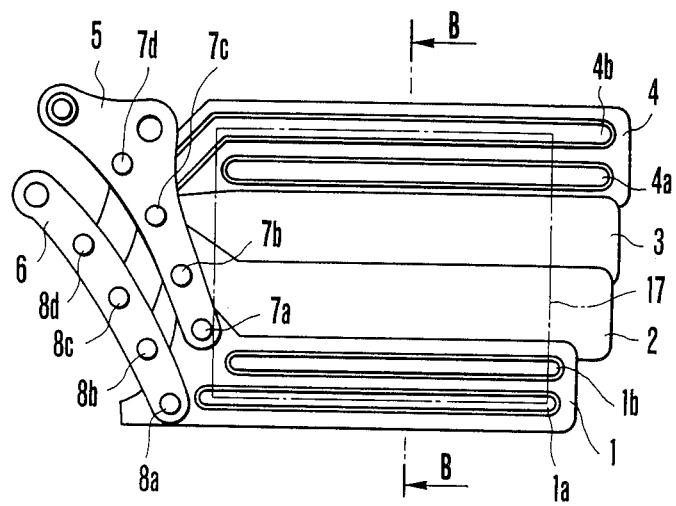
Figure 5B:
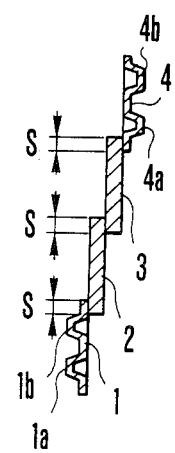
FIG. 5(b) is a sectional side view of the blade group.

FIGS. 5(a) and 5(b) show a second embodiment of this invention. FIG. 5(a) is a plan view showing a blade group covering the shutter aperture 17. FIG. 5(b) is a sectional view taken on line B—B shown in the middle of the blade group of FIG. 5(a). The blade group is arranged in the same manner as the conventional shutter blades 1, 2, 3, 4 shown in FIG. 2. Therefore, the members and parts which are the same as those of FIG. 2 are identified by the same reference numerals. Referring to FIGS. 5(a) and 5(b), the slit forming blade 1 and the rear end blade 4 are respectively provided with the protruding embossed parts 1a, 4a on their surfaces, and do come in contact with the other divided blades 2 and 3 which are adjacent to them. Each of the blades 1 and 4 has two narrow oblong embossed parts 1a and 1b or 4a and 4b which are side by side in the longitudinal direction of the blade 1, 4 with their reverse side formed into recessed shapes. The arrangement is such that these blades 1, 4 are contacting each other at their flat surfaces. The embossed parts 1a, 1b, 4a, 4b, do not extend to the parts connected to the arms 5, 6 as mentioned in the foregoing and also do not extend to the peripheral areas of the blades 1, 4.

Figure 6A:
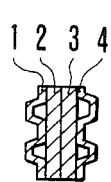
FIGS. 6(a) and 6(b) are sectional side views respectively showing the blades in their operating states.
Figure 6B:
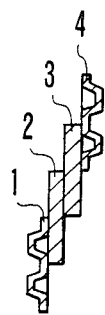

FIGS. 6(a) and 6(b) respectively show the group of blades shown in FIGS. 5(a) and 5(b) in a stowed state and between a state halfway in an open or closed position. As is apparent from these illustrations, the provision of the embossed parts 1a, 1b, 4a, 4b imposes no limitation on the positional relation, etc. between these blades 1, 4 and gives a sufficient overlapping extent S between adjacent blades 2, 3 in the same manner as with conventional shutters. There is no fear of light leakage since the blades 1, 2, 3, 4 are in close contact with each other. There is no interference between the blades 1, 2, 3, 4 due to the embossed parts 1a, 1b, 4a, 4b. The embodiments thus ensures smooth operation of the group of blades.

Figure 7:
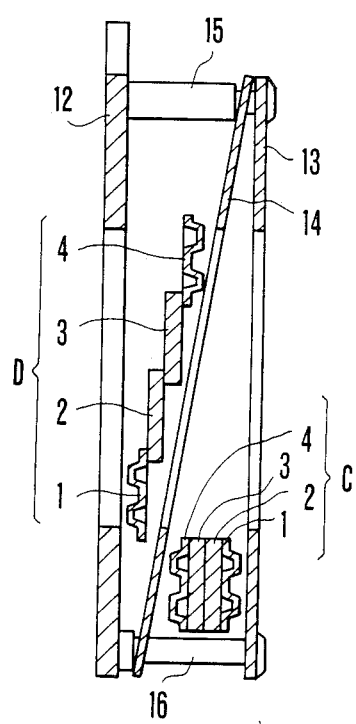

FIG. 7 is a longitudinal sectional view showing the aperture 17 located in the middle of the shutter having the blade group shown in FIGS. 5(a) and 5(b). The shutter is shown in a state of having completed its operation. The illustration includes a leading group of blades C; a trailing group of blades D; a shutter base plate 12; a cover base plate 13 which is mounted a predetermined distance away from the shutter base plate 12; a partition plate 14 which leaves travelling spaces for the leading and trailing groups of blades C and D and is obliquely disposed relative to the base plate 12; and studs 15 and 16 which support the cover base plate 13 and define the position of the partition plate 14.

Let us now consider a case where every divided blade 2, 3, 4 is provided with an embossed part 2a, 3a, 4a in the same way as the slit forming blade 1. If all the blades 2, 3, 4 have their protrudent parts 2a, 3a, 4a on the same side and overlap each other to a sufficient overlapping degree S for preventing any light leakage when the shutter aperture 17 is covered by them as shown in FIGS. 8(a) and 8(b), edge parts 1d, 2d and 3d collide with the embossed protrusions 2a, 3a and 4a of the adjoining blades 2, 3, 4 respectively in stowing the blade group. The stowing process, therefore, cannot be smoothly carried out.

Furthermore, referring to FIGS. 9(a) and 9(b), in order to bring the above-stated edge parts 1d, 2d and 3d into a state of riding on the embossed protrusions 2a, 3a and 4a of the adjoining blades 2, 3, 4 in covering the aperture 17 with the blades 1, 2, 3, 4, the width of each embossed part 2a, 3a, 4a, must be extended downward as viewed on the drawings. However, since the blades 2, 3, 4 must have some flat parts 2c, 3c and 4c left in carrying out an embossing process, the width of the embossed parts 2a, 3a, 4a cannot be much increased. Compared with the arrangement shown in FIGS. 8(a) and 8(b), therefore, the blade overlapping degree S in this case becomes much smaller and light tends to leak from the overlapping parts as shown by arrows.

In either of the above-stated cases, the blades 1, 2, 3, 4 must be in close contact with each other with their end parts restricted to prevent light leakage within the limited thickness of the travelling space. Under such a condition, the embossed protrudent and recessed parts 2a, 3a, 4a of these blades 2, 3, 4 interfere with each other during a shutter operation. Therefore, smooth movement of the group of blades is hardly possible. FIGS. 10(a), 10(b), 11(a) and 11(b) show such an irregularity of the movement of blades 1, 2, 3, 4. FIG. 10(a) is a sectional view showing the blade group of FIGS. 8(a) and 8(b) in a completely overlapped state. FIG. 10(b) is a sectional view showing the blades 1, 2, 3, 4 in operation. FIG. 11(a) is a sectional view showing the blade group of FIGS. 9(a) and 9(b) in a completely overlapped state. FIG. 11(b) is a sectional view showing the blades 1, 2, 3, 4 in operation.

With the group of blades thus interrupted in their smooth operation, the shutter blind speed cannot be increased, the exposure accuracy of the shutter decreases and the durability of the blades decreases.

FIGS. 12(a) and 12(b) show another embodiment of this invention. In this example, every divided blade 1, 2, 3, 4 is provided with an embossed part 1a, 1b, 2a, 2b, 3a, 3b, 4a, 4b for reinforcement and yet the blades 1, 2, 3, 4 smoothly operate without the above-stated interruption. The illustration shows the shutter blade group in a state of covering the shutter aperture 17. FIG. 12(a) is a plan view and FIG. 12(b) a sectional view taken on line D—D of FIG. 12(a). The members and parts which function in the same manner as in the preceding example are identified by the same reference numerals. All the divided blades 1, 2, 3 and 4 which form a blade group are provided with two embossed parts 1a and 1b; 2a and 2b; 3a and 3b; and 4a and 4b respectively. Each of these embossed parts 1a, 1b, 2a, 2b, 3a, 3b, 4a, 4b extends in the longitudinal direction of the blade 1, 2, 3, 4. The embossed protrusions 1a, 1b, 4a, 4b of the slit forming blade 1 and the rear end blade 4 are on the reverse side of the surfaces which slidably contact other blades 2 and 3. Meanwhile, the blades 2 and 3 which slidably contact other divided blades 1, 4 on both the front and reverse sides have the embossed protrusions 2a and 3a which first contact with the blades 1 and 2 when the blade group shifts from the shutter aperture 17 closing state to the shutter aperture 17 opening state and have slanted surface parts 2e and 3e respectively. The pairs of the embossed protrusions 2a and 2b and 3a and 3b are respectively interconnected by embossed protrusions 2f and 3f which extend in a direction perpendicular to the other embossed protrusions 2a, 2b, 3a, 3b.

In covering the aperture 17, these divided blades 1, 2, 3, 4 are overlapping each other at their flat parts to a sufficient overlapping degree and are in contact with each other to a sufficient closeness to adequately prevent light leakage.

In opening the aperture 17 from this covered state, the arms 5 and 6 turn counterclockwise to stow the blades 1, 2, 3, 4 together. In this process, the upper ends of the blades 1 and 2 move upward along the above-stated slanting faces 2e and 3e of the embossed protrusions 2a, 2b, 3a, 3b while the blade 3 slides with its flat face in contact with that of the blade 4. Therefore, the trouble shown in FIG. 11 never happens. FIG. 13 shows the actions of the slanting face parts 2e and 3e, showing only the blades 1 and 2 while the other blades 3, 4 are omitted there.

Referring to FIG. 13, these blades 1 and 2 are shown halfway in the process of closing the shutter aperture 17. As shown, the upper end 1d of the blade 1 is riding on the slanting face 2e of the embossed protrusion 2a of the blade 2 while moving in the direction of the arrow. In this case, the smaller an angle $\theta$ defined by the slanting face 2e and the flat face of the same blade 2 is, the smaller the resistance to the closing operation of the blade group will be to smooth the closing operation. Furthermore, chamfer to chamfering and rounding the upper edge of the blade 1, which abuts on the slanting face 2e shown by a dotted line in FIG. 14, furthers the smoothening effect.

FIG. 14 is an enlarged view of the area around the slanting face part 2e of FIG. 13 showing in a vector the relation between the forces of the blades 1 and 2. Referring to FIG. 14, the blade 1 exerts a force F on the blade 2. The force F has a component force (magnitude: $|F|\cos\theta$) with which the blade 1 is riding on the slanting face 2e and a component force F2 (magnitude: $|F|\sin\theta$) with which the blade 1 is pushed perpendicular to the slanting face 2e. There is a perpendicular drag F3 which is perpendicular to the slanting face 2e as a reaction to the force F2 and is of the same magnitude $|F|\sin\theta$ as the force F2. A frictional force F4 which obtained along the slanting face 2e is of the magnitude $\mu|F3|=\mu|F|\sin\theta$, wherein $\mu$ represents a coefficient of friction. A condition for the blade 1 riding over the slanting face 2e can be expressed as follows:

$$|F1| > |F4| \qquad (1)$$

$$|F|\cos\theta > \mu\,|F|\sin\theta.$$

$$\therefore \tan\theta < 1/\mu$$

Assuming that $\mu$ is a coefficient of static friction, the value of $\mu$ is 1.40 in the case of friction between pieces of pure aluminum, which is one of the soft metals having the largest value of $\mu$. In that instance, the angle $\theta$ becomes $\theta < 35°30'$ according to Formula (1) above and the angle $\theta$ must be of a considerably smaller value. For actual shutter blades 1, 2, 3, 4, however, the use of pure aluminum is hardly conceivable. If the blades 1, 2, 3, 4 are to be made of a metal, a harder metal material such as an aluminum alloy, a titanium alloy or the like will be used. If a synthetic resin is to be used, it is naturally plated with a hard metal and the friction is lessened by applying some lubricant. Therefore, the value of $\mu$ can be expected to seldom exceed 1.0. Based on the results of measurement made by Bowden, et al., the coefficient of friction between almost any materials does not exceed 1.0. Furthermore, in the operation of the group of blades, $\mu$ is a coefficient of kinetic friction which is smaller than that of the static friction and the value $\mu=1.0$ is an excessive estimate. Therefore, even in the event that the angle $\theta$ is 45°, the blade 1 is capable of smoothly riding over the slanting face 2e.

FIGS. 15(a) and 15(b) respectively show in sectional views the group of blades shown in FIGS. 12(a) and 12(b) in a state of having been stowed together and halfway in an opening or closing process. These sectional views are taken on line D—D of FIG. 12(a). What is shown in particular in these illustrations is as follows: The pair of embossed parts 2a and 2b and the pair of embossed parts 3a and 3b are respectively connected by other embossed parts 2f and 3f, the most protrudent parts on the same plane protrude to the same extent as those of the other embossed protrusions. This arrangement effectively prevents the longitudinally embossed protrudent and recessed parts of adjacent blades 1, 2, 3, 4 from rattling due to interference with each other during the opening or closing operation of the shutter, because: The connecting embossed parts 2f and 3f serve to support and guide the blades 2, 3 superimposed thereon. The embossed parts 2f and 3f may be obliquely arranged relative to the longitudinal embossed parts 2a, 3a, etc. However, since the blades 2 and 3 are adjoining, the embossed parts 2f and 3f must be arranged in positions not interfering with each other during the operation of the group of blades.

FIG. 16 is a sectional view taken longitudinally along the middle part of a shutter incorporating therein the group of blades shown in FIGS. 12(a) and 12(b), with the shutter being shown as having completed its operation. The illustration includes a leading group of blades G; a trailing group of blades H; the shutter base plate 12; the cover base plate 13 mounted at a predetermined spacing distance from the shutter base plate 12; the partition plate 14 which separates the opening blade group G and the closing blade group H leaving a travelling space between them; and the supporting studs 15 and 16 to support the cover base plate 13 and to determine the position of the partition plate 14.

Figures 17A, 17B:
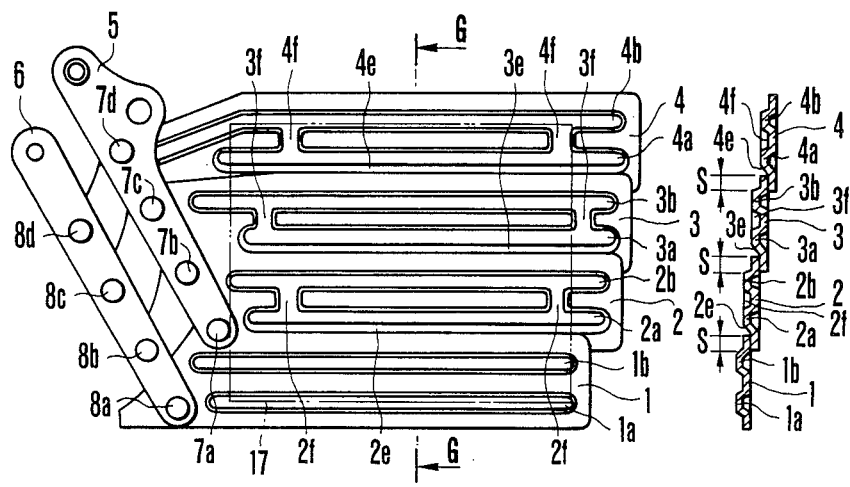
FIG. 17(a) is a front view of a fourth embodiment of this invention.
FIG. 17(b) is a sectional side view of the fourth embodiment.

FIGS. 17(a) and 17(b) show a fourth embodiment of this invention covering the shutter aperture 17 with a group of shutter blades 1, 2, 3, 4. FIG. 17(a) is a plan view and FIG. 17(b) is a sectional view taken on line G—G of FIG. 17(a). In this embodiment, the embossed protrusions of all the blades 1-4 protrude in one and the same direction or on the same side. Because of that, the rear end blade 4 is provided with the slanting face part 4e and the vertical embossed parts 4f in the same manner as the other blades 2 and 3. With this exception, the example is arranged in the same manner as the first embodiment.

Figures 18A, 18B:
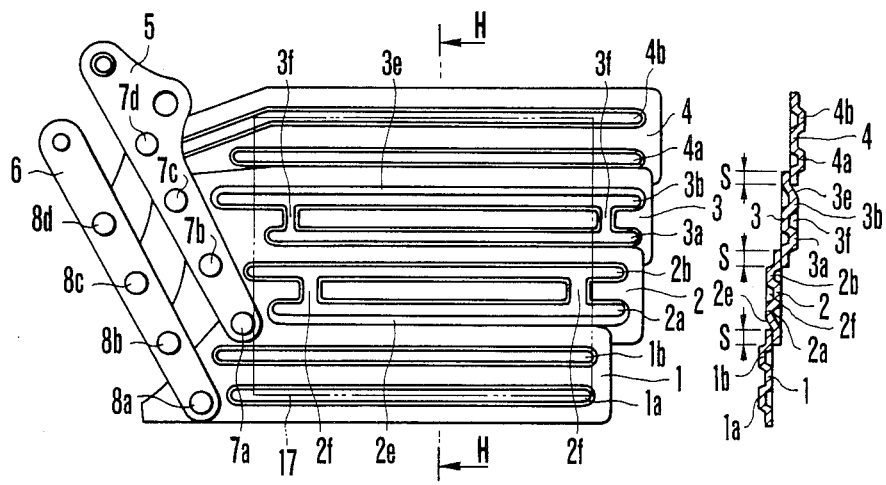
FIG. 18(a) is a front view of a fifth embodiment of the invention.
FIG. 18(b) is a sectional side view of the same embodiment.

FIGS. 18(a) and 18(b) show a fifth embodiment of this invention covering the shutter aperture 17 with a group of shutter blades 1, 2, 3, 4. FIG. 18(a) is a plan view while FIG. 18(b) is a sectional view taken on line H—H of FIG. 18(a).

In this case, the blade 3 of the third embodiment is changed to have its embossed parts 3a, 3b protrude on the reverse side. The embossed part 3b which first abuts the blade 4 is provided with the slanting face part 3e. With the exception of these points, the fifth embodiment is arranged in the same manner as the third embodiment.

Figure 19:
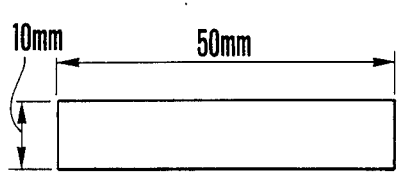
FIGS. 19 and 20 are plan views showing test pieces of a material used for the blades.
Figure 20:
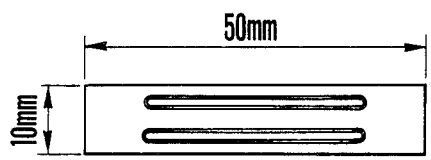
Figure 21:
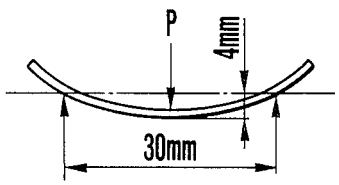
FIG. 21 is an illustration of a method used for measurement of test results.

Next, the improvement in bending strength and reduction in weight attained by providing the shutter blades 1, 2, 3, 4 with embossed parts which have been actually measured are described below:

FIG. 19 shows the outside dimensions of a test piece having a uniform thickness. FIG. 20 shows a test piece which is prepared by providing the above-stated test piece with two embossed parts. Each of the embossed parts measures 1 mm in width, 30 mm in length and 70$\mu$ in the protruding extent. Each of the test pieces was subjected to a test. The test was conducted with the test piece supported at two ends spaced at a span of 30 mm as shown in FIG. 21. A load is applied to the middle part of the test piece. A value P is measured when the middle part of the test piece flexed 4 mm. Thus, the magnitudes of deforming resistance to bending of the two test pieces were compared. Generally, the shutter blades 1, 2, 3, 4 must firmly keep their flatness without much flexing even against a driving force applied during their travel and against an impact received upon completion of travel. In view of this, bending rigidity EIZ (wherein E represents the modulus of longitudinal elasticity and IZ the geometrical moment of inertia relative to a neutral axis) is considered the most important factor. Therefore, evaluation can be made on the basis of the bending rigidity EIZ.

Figure 22:
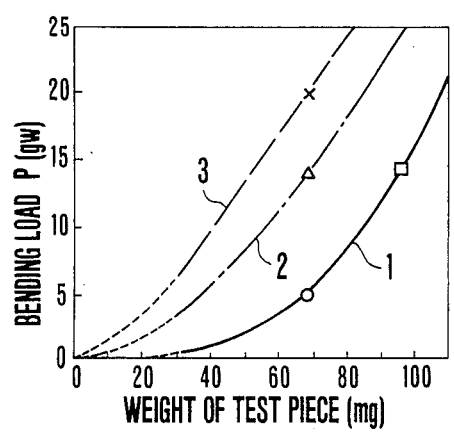
FIG. 22 is a graph showing bending loads in relation to the weight of the test pieces.
Figure 23:
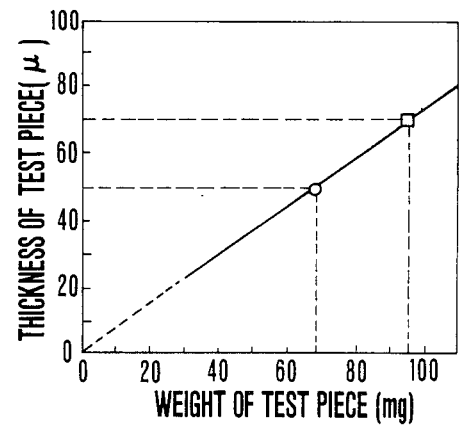
FIG. 23 is a graph showing the thickness of the test pieces in relation to their weight.

FIG. 22 is a graph showing the results of the above-stated tests, which were conducted with the test piece made of a super duralmine material A 2024. In the graph, the axis of ordinate shows the bending loads P, the axis of abscissa and the weight of the test pieces. A full line 1 represents plain test pieces having no embossed part; one-dot chain line 2, test pieces provided with two embossed lines; and a broken line, 3 test pieces provided with four embossed lines. FIG. 23 is a graph showing the relation between the thickness and weight of the above-stated plain test pieces which are made of the material A 2024. For the sake of illustration, the values of the typical test pieces are indicated by marks o, □, Δ and x.

For example, a plain test piece (without embossed parts) measuring 50$\mu$ in thickness, measures 68 mg in weight as shown in FIG. 23. A group of shutter blades made of this sheet material is very light in weight to permit an increase in the shutter blind speed to attain a high shutter speed and is synchronized at a high speed with a relatively small driving force. However, this group of shutter blades is too weak in bending rigidity and greatly flex when they travel. As a result, they break by colliding with the partition plate 14 or pop out from the shutter aperture 17. The measured value of the bending load P of this test piece is only 5 gw. This is plotted at the mark "o" on the curve 1 of FIG. 22. However, when the same test piece is provided with the two embossed lines as shown in FIG. 20, the bending load increased to 14 gw which is about three times as high as the value obtained when it is not embossed, while the weight of the test piece remains unchanged and is 68 mg. This is plotted by the mark "Δ" on the curve 2 of FIG. 22. Then, it has been found that, in order to have the same bending load, the plain test piece having no embossed reinforcement part must have a thickness which weighs 95 mg as plotted by the mark "□" on the curve 1 of FIG. 22.

Referring to FIG. 23, the plain test piece weighing 95 mg must have a thickness of 70$\mu$. In other words, the bending rigidity of the material A 2024 of a weight corresponding to a thickness of 50$\mu$ can be increased up to a bending rigidity value corresponding to the thickness of 70$\mu$ by just providing it with two embossed lines.

Therefore, an experiment was conducted by preparing a group of plain shutter blades made from the material A 2024 of a thickness of 70$\mu$ and another group of shutter blades which were made from the same material but measuring 50μ in thickness and were embossed as shown in FIG. 20. Each of these two groups was assembled into a shutter and subjected to operation tests. The results of tests were as follows:

In the case of the former blade group measuring 70μ in thickness, the heavy weight of them requires an increased driving force when the shutter blind speed is increased for attaining a predetermined high shutter speed and a high speed synchronization. Then, the inertia of the shutter becomes large to cause a large impace on the shutter blades at the end of their travel. Despite of the increased bending rigidity, the durability of the slit forming blade is degraded by the large impact.

Meanwhile, in the case of the latter blade group in which every blade is provided with two embossed lines and measures 50μ in thickness, the smaller weight of them requires only a small driving force in increasing the shutter blind speed for satisfying the same conditions. The inertia of the shutter blades are also small. Further, since the bending rigidity of the embossed blades has been increased up to the same value as that of the above-stated blades of thickness of 70μ, the shutter is capable of operating with sufficient durability.

Further, in case that the test piece which is made of a material A 2024 measuring 50μ in thickness is provided with four embossed lines, the bending load increases up to 20 gw while the weight of the test piece remains at 68 mg as plotted with the mark "x" on the curve 3 of FIG. 22. This value corresponds to the value of a plain test piece of A 2024 measuring 80μ in thickness. Therefore, with the shutter blades which are made of the material A 2024 measuring 50μ in thickness and provided with four embossed lines, the shutter blade group consisting of them has a further increased durability and, accordingly, a higher reliability.

In accordance with this invention, as described in the foregoing, a slit forming shutter blade is provided with embossed surface parts for reinforcement by utilizing a void space or gap which exists between the surface of the slit forming blade and the heads of the connecting studs and heretofore has been left unused. Further, divided blades which are arranged to slidably contact other blades on both sides of them are also provided with embossed reinforcement parts having slanting surface parts respectively. The invented arrangement permits reduction in weight of all the blades by thinning them without imparing their rigidity and light shielding capability. Therefore, a shutter capable of operating at a high speed is obtainable. It is another advantage of the invention that the embossed reinforcement which permits use of thinner blades does not increase the thickness of the shutter blade group. Therefore, the travelling space for the shutter blades does not have to be increased.

The shutter blades can be made of a light metal material such as titanium, aluminum, magnesium, their alloys, etc. or a synthetic resin material of a small specific gravity with a relatively simple process for embossing employed. For example, such simple processes include a drawing process, a molding process, etc. The arrangement to form the embossed parts in the longitudinal direction of the blades effectively prevents the occurrence of problem relative to the flatness of the blades which tends to arise in the longitudinal direction of them.

What is claimed is:

1. In a focal plane shutter having a shutter base plate which is provided with a shutter aperture and two groups of shutter blades which are arranged to open and close the aperture, the improvement comprising each of said shutter blade groups including driving arms pivotally carried by said base plate and arranged to be turnable thereon and a plurality of divided blades which are respectively connected to said arms through connecting studs and arranged to be turnable on the studs in such a manner that the divided blades overlap each other and that a slit forming divided blade which is separated farthest from a turning center of the arms among said divided blades is provided with an embossed protrusion which extends in the longitudinal direction of said blade and is protruding on one side thereof not coming into contact with other blades.

2. A focal plane shutter according to clam 1, wherein a rear end blade which is located most closely to the turning center of the arms among said divided blades is provided with embossed protrusions which extend in the longitudinal direction of said blade and are protruding on one side of the blade not coming into contact with other blades.

3. In a focal plane shutter having a shutter base plate which is provided with a shutter aperture and two groups of shutter blades which are arranged to open and close the aperture, the improvement comprising each of said shutter blade groups including driving arms pivotally carried by said base plate and arranged to be turnable on the base plate and a plurality of divided blades which are respectively connected to said arms through connecting studs and arranged to be turnable on the studs in such a manner; that the divided blades overlap each other; that among said divided blades, the blades which are arranged to slidably contact other divided blades on both sides thereof are provided with an embossed protrusion extending in the longitudinal direction of the blades; and that the parts of said embossed blades which first come to abut on other blades are formed into slanting faces slanting at an angle not exceeding 45 degrees relative to the flat portions of said blades.

4. A focal plane shutter according to claim 3, wherein each of said divided blades which are slidably contacting other divided blades on both sides thereof is provided with a plurality of embossed protrusions extending in the longitudinal direction of said blades and at least one embossed protrusion part which extends in the direction of intersecting said longitudinal embossed protrusions to interconnect said longitudinal embossed protrusions with each other.

5. A focal plane shutter according to claim 1 or 3, wherein said divided blades are made of a thin sheet metal material; and said embossed protrusion is formed through a drawing process.

6. A focal plane shutter according to claim 1 or 3, wherein said divided blades having said embossed protrusion is made of a synthetic resin and formed through a molding process.

* * * * *

UNITED STATES PATENT AND TRADEMARK OFFICE
CERTIFICATE OF CORRECTION

PATENT NO. : 4,660,952

DATED : April 28, 1987

INVENTOR(S) : Yasuhiro Toyoda et al

It is certified that error appears in the above-identified patent and that said Letters Patent is hereby corrected as shown below: On the title page In the heading of the Patent, it should read:

-- [73] Assignee: Canon Kabushiki Kaisha, Tokyo, Japan

Signed and Sealed this

Second Day of August, 1988

Attest:

DONALD J. QUIGG

Attesting Officer

Commissioner of Patents and Trademarks